United States Patent

Foley

[15] 3,646,507

[45] Feb. 29, 1972

[54] VEHICLE ALTITUDE CONTROL SYSTEM

[72] Inventor: James W. B. Foley, Lanesboro, Mass.

[73] Assignee: The United States of America as represented by the Secretary of the Navy

[22] Filed: Dec. 5, 1966

[21] Appl. No.: 599,993

[52] U.S. Cl. .......................... 340/3 R, 114/25, 340/3 T, 343/7 TA
[51] Int. Cl. ............................................. G01s 9/66
[58] Field of Search ............. 340/3, 3 T, 16 R, 1; 343/7 TA; 114/25

[56] References Cited

UNITED STATES PATENTS 2,962,997 12/1960 Stedman ............................. 114/25
3,123,797 3/1964 Ehrman ............................. 340/1
3,153,220 10/1964 Hagemann ......................... 340/3

Primary Examiner—Richard A. Farley
Attorney—Louis A. Miller and D. Doty

[57] ABSTRACT

An altitude control system for guiding a submarine vehicle in such manner as to search for and hunt along a reference altitude above the sea floor having a sonar range signal generator, a vehicle pitch signal generator, an adjustable reference altitude voltage source, and a series-connected summing amplifier and direct current level detector coupled to the aforesaid range and pitch signal generators and said reference altitude voltage source for automatically regulating the control surfaces of said submarine vehicle in accordance with the algebraic sum of the output signals therefrom.

9 Claims, 4 Drawing Figures

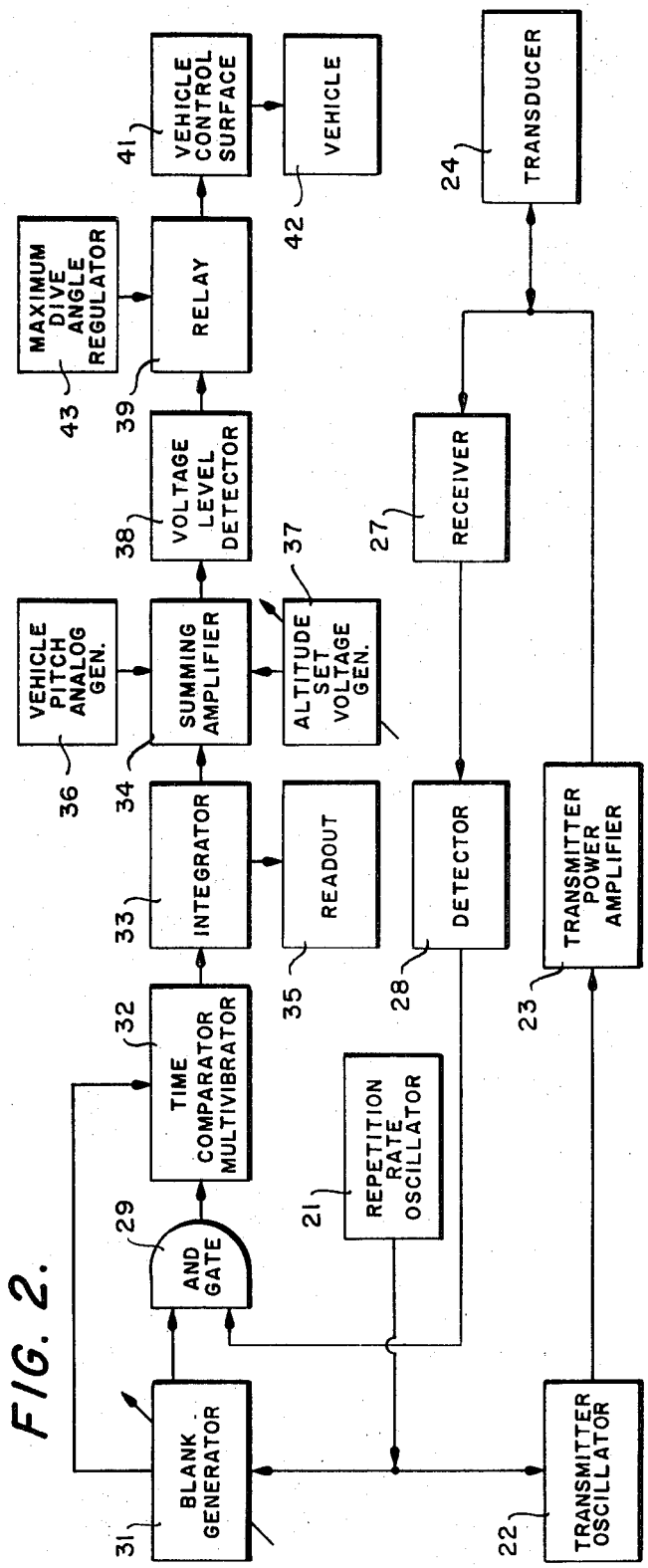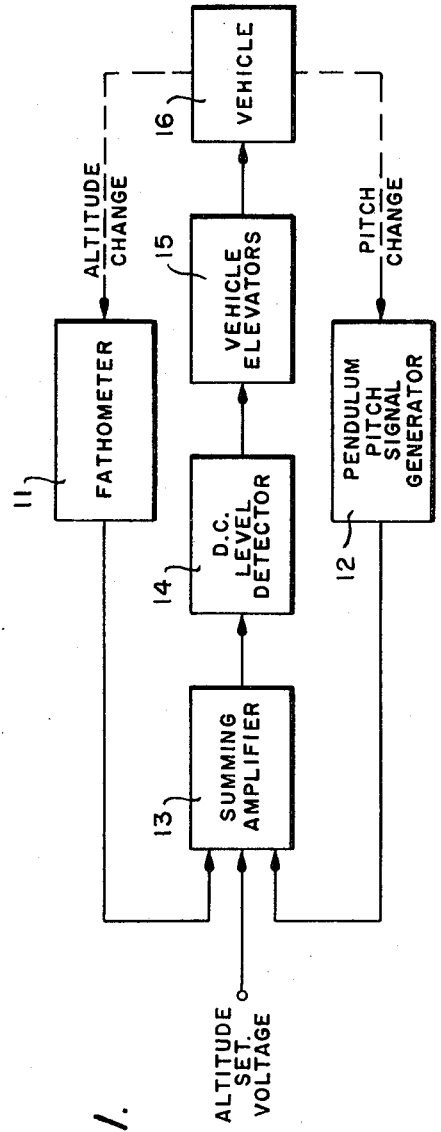

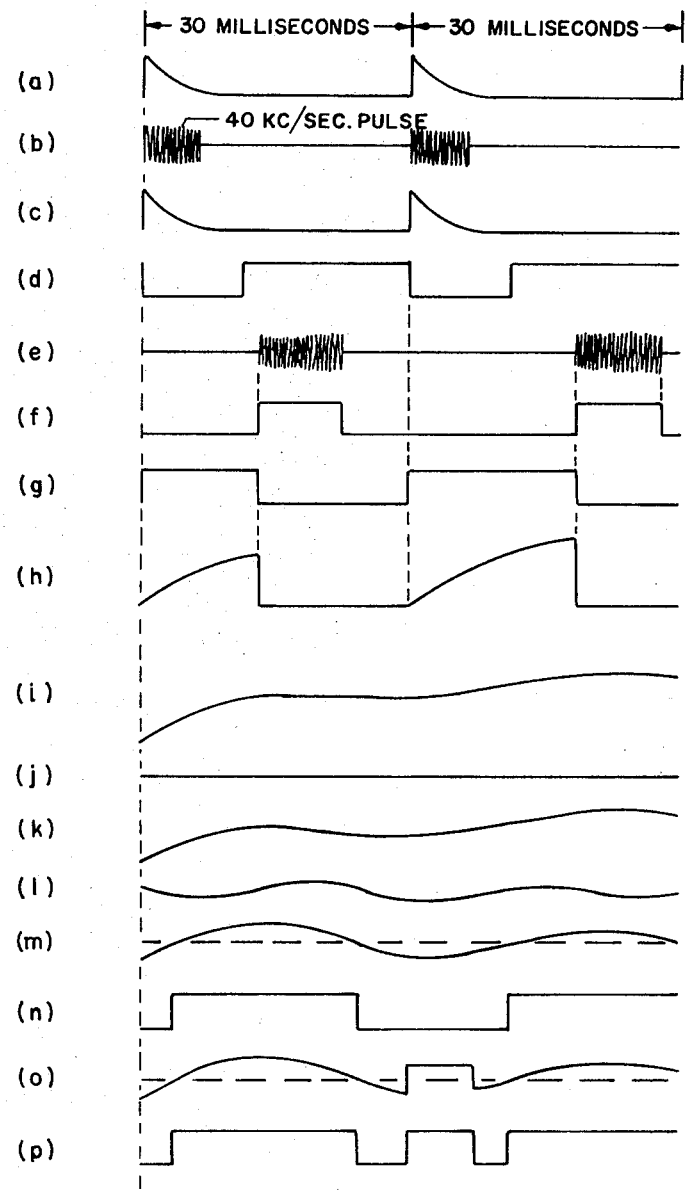
FIG. 3.
FIG. 4.
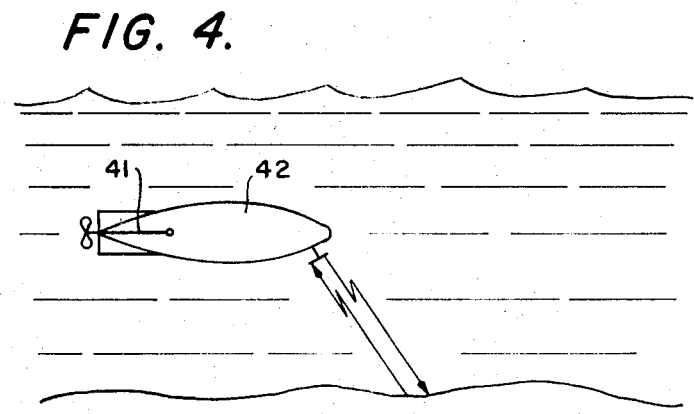
INVENTOR.
JAMES W. B. FOLEY

VEHICLE ALTITUDE CONTROL SYSTEM

The present invention relates generally to closed-loop feedback control systems and, in particular, is a vehicle altitude control system. In even greater particularity, it is a system for automatically controlling the altitude and pitch of a self-propelled, moving submarine vehicle in such manner as to cause it to seek and hunt along a preset altitude above the floor of the ocean.

In the past, devices have been devised that perform substantially similar control functions; but, for the most part, they were usually somewhat inaccurate, were complex and expensive to manufacture, burdensome to handle and operate, and, in general, left a great deal to be desired from reliability, efficiency, and speed-of-operation standpoints. Moreover, some of such devices utilized echo-ranging sonar in conjunction with vehicle-towing apparatus, and, accordingly, they did not independently and automatically seek the desired altitude but, instead, only followed it once it was acquired.

The present invention overcomes most of the disadvantages of the known prior art devices, in that it will enable a self-propelled underwater vehicle to simply and automatically dive from the sea surface, detect the sea floor during the dive, and level off at some preselected altitude above the bottom. In addition, it is ostensively a considerable improvement over the prior art, in that, once acquired, it will follow comparatively low altitudes with accuracy.

It is, therefore, an object of the invention to provide an improved closed-loop, feedback, automatic control system.

Another object of this invention is to provide an improved vehicle altitude control system.

Still another object of this invention is to provide an improved method and means of making a moving submarine vehicle automatically dive below the sea surface, detect the sea floor during the dive, seek a preselected altitude above said sea floor, and accurately hunt therealong.

A further object of this invention is to provide an improved automatic altitude control system for a self-propelled underwater vehicle.

Another object of this invention is to provide a vehicle altitude control system that will closely follow relatively low control altitudes.

Another object of this invention is to provide a method and means for enabling a submarine vehicle to accurately follow a preselected altitude above the sea floor while traveling at relatively high speed.

Still another object of this invention is to provide a vehicle control system that is easily and economically manufactured, operated, and maintained.

Other objects and many of the attendant advantages will be readily appreciated as the subject invention becomes better understood by reference to the following detailed description when considered in conjunction with the accompanying drawings wherein:

FIG. 1 is a simplified block diagram of a functional system incorporating the subject invention; and FIG. 2 is a more detailed block diagram of the subject invention;

FIG. 3 is an idealized graphical representation of the output signals from the various elements of the device of FIG. 2; and FIG. 4 is a simplified quasi-pictorial view of a submarine vehicle which may incorporate the subject invention to an advantage.

Referring now to FIG. 1, there is shown a Fathometer 11 for measuring the altitude and altitude change of a movable vehicle. Similarly, the altitude or pitch and pitch change of said movable vehicle is measured with respect to a horizontal datum by a pendulum pitch signal generator 12. Outputs of said fathometer and pitch signal generator are both applied to a pair of inputs of a summing amplifier 13. An altitude setting signal or voltage is also applied to an input of summing amplifier 13, and this signal acts as the control altitude voltage because it is so summed in summing amplifier 13 that it cancels the voltage present therein when the pitch is zero and the vehicle is running at the desired height above the bottom.

The output of summing amplifier 13 is connected to the input of a DC voltage level detector 14, the output of which is effectively connected to the vehicle elevators 15 which, in turn, varies the altitude and direction of vehicle 16 in such manner as to make it seek and hunt along a preselected altitude.

The embodiment of the invention depicted in greater detail in FIG. 2 shows a repetition rate oscillator 21 which, in effect, produces a clock pulse that is used as the basic timing unit for the entire system.

The output of repetition rate oscillator 21 is coupled to the input of a transmitter oscillator 22 for the timely production of a CW ping-type signal. A transmitter power amplifier 23 is connected between the output of said transmitter oscillator 22 and the input of a transducer 24.

Since in this particular instance the vehicle to be controlled is an underwater vehicle, the aforesaid transducer 24 is a reversible electroacoustical transducer which broadcasts acoustical energy throughout the subaqueous environmental medium in which it is operating in response to an electrical signal supplied to the input thereof, and generates an electrical output signal in response to an acoustical signal received from said subaqueous environmental medium within which it is submerged. Although transducer 24 is defined as being an electroacoustical transducer that is part of a sonar type system that operates in a submarine environment, it should be understood that in the event the operational environment is something other than aqueous (say atmospheric, for example), an appropriately designed transducer may be substituted therefor. Obviously, so doing would be well within the purview of the artisan having the benefit of the teachings herewith presented.

Being reversible, the output signal of transducer 24 is connected to the input of a receiver 27, which may, for instance, contain such signal processing elements as limiters, filters, amplifiers, etc., in order to put it into a more useful form. The output of receiver 27 is connected to the input of a detector 28, the output of which is, in turn, coupled to one of the inputs of an AND-gate 29.

The aforementioned repetition rate oscillator 21 also has its output connected to the input of a variable blanking signal generator 31, and one of the outputs thereof is connected to the other input of AND-gate 29. The output of AND-gate 29 and the other output of the aforesaid blanking signal generator 31 are respectively applied to a pair of compatible inputs of a time comparator multivibrator 32, which, to effect this particular function, is preferably a properly designed bistable multivibrator that changes state according to the presence of the inputs thereto, with the blanking signal input overriding the input from AND-gate 29 to effectively stop it from passing therethrough, as will be explained in greater detail subsequently in the discussion of the operation of the entire invention.

The output of time comparator multivibrator 32 is coupled to the input of an integrator 33, with the operative signal output thereof connected to one of the inputs of a summing amplifier 34, and the indicator output thereof optionally connected to the input of any appropriate indicating and/or recording readout 35. Readout 35 may, for example, be a recorder, or the like, which records the direct current voltage of the output signal of integrator 33 wither directly or in terms of the measured distance to the sea floor or other datum, if so desired.

A vehicle pitch analog generator 36, which generates an electrical signal that is proportional to the pitch angle of the vehicle from the horizontal, has its output connected to another of the inputs of summing amplifier 34. Generator 36 may, for instance, be a suitably powered potentiometer, with a pendulum effectively connected to the movable arm thereof in such manner that, when it moves due to a change in vehicle pitch, a potential proportional to said movement is supplied to summing amplifier 34.

A zero setting device 37 is connected to still another input of summing amplifier 34 in such manner as to supply a direct current voltage thereto which represents the control altitude point. It is preferably manually or otherwise adjustable, in order that the control altitude, which the vehicle automatically follows, may be changed as necessary to meet operational requirements and circumstances.

The output of summing amplifier 34 is coupled to the input of a voltage level detector 38, which determines whether or not a prescribed threshold voltage has been reached. The output thereof is coupled to a normally deenergized relay 39 in such manner that when said prescribed threshold voltage has been reached it becomes energized.

Relay 39 is so connected to a vehicle control surface 41, such as, for example, an elevator, that, in its deenergized condition, is automatically urged toward and, thus, calls for a down elevator position, while in its energized condition, it calls for an up elevator position. Of course, as is conventional with underwater vehicles, a down elevator position causes a vehicle 42 to dive toward the sea floor and an up elevator position causes it to climb toward the sea surface.

The foregoing up and down elevator signals are restricted to certain limits which prevent the vehicle from diving at too great an angle. Accordingly, a maximum dive angle regulator 43 may be any preferred type, but it has been found that a simple mercury switch securely mounted as a level on the vehicle and in parallel with the longitudinal axis thereof serves this purpose very well.

At this time, it would perhaps be well to mention that all of the elements disclosed in block form in the devices of FIGS. 1 and 2 are well known and conventional per se; therefore, it is to be understood that it is their concerted arrangement, new combination, and new interactions that constitute the subject invention and produce the new and improved results effected thereby.

The operation of the invention will now be discussed briefly in conjunction with all of the figures of the drawing as follows:

As may readily be seen by inspection of FIG. 1, the inputs to the invention are signals representing vehicle altitude and vehicle pitch. They are, of course, supplied thereto as a result of the vehicle altitude and pitch being measured by a Fathometer and pitch pendulum, or the like, respectively. As the vehicle altitude and pitch are being continuously measured, their representative signals are added proportionally in the summing amplifier, along with a control altitude analog voltage or a zero set, as it is herewith defined. The summing amplifier output voltage is then used to move the elevator control surfaces in such manner that the vehicle they are controlling responds thereto to cause the input altitude and pitch voltages to cancel the zero set control point voltage. At the time such cancellation occurs, the vehicle will be running at substantially the preselected altitude and will continue to hunt therealong, until acted upon by some outside force or adjusted to do otherwise.

How the aforementioned broadly defined operation is actually effected, will now be discussed in connection with the device of FIG. 2, inasmuch as it functionally discloses the actions and interactions performed by the elements illustrated therein.

Referring now to FIG. 2, as previously suggested, repetition rate oscillator 21 is actually a clock pulse generator which generates a series of timing pulses, similar to those shown in FIG. 3(a), at a preselected frequency. Said timing pulses are then used as the basic timing units for the remainder of the invention. The frequency of said clock pulses is, of course, a matter of design choice, and accordingly, should be selected so as to make the invention operable in any given medium. However, since the preferred embodiment disclosed herewith is intended to operate in an aqueous environment, the clock pulse frequency is preferably selected to be such as to allow 30 milliseconds between successive ones thereof.

The timing pulse output of repetition rate oscillator 21 is applied to and timely triggers transmitter oscillator 22, which generates a four hundred kilocycle per second ping-type CW signal of predetermined length comparable to that shown in FIG. 3(b). This signal is then amplified to a more useful level by power amplifier 23 before being applied to transducer 24. In response to said amplifier 23 before being applied to transducer 24. In response to said amplified input signal, transducer 24 broadcasts an acoustical sonar signal proportional thereto down toward the sea floor, from which it is reflected back as an acoustical echo signal somewhat similar to that represented by FIG. 3(e), which is then timely received by transducer 24. Being reversible, transducer 24 converts the received acoustical echo into a proportional electrical signal that is supplied to receiver 27 for appropriate filtering, limiting, amplifying, and other processing as warranted to optimize the characteristics thereof. This improved signal is then detected to obtain the envelope thereof and also maintain the same polarity therein, after which it is applied in substantially the form illustrated in FIG. 3(f) to one of the inputs of AND gate 29.

The timing pulse of repetition rate oscillator 21 is also supplied to blanking generator 31, which produces a blanking signal of the type idealized in FIG. 3(d) that is applied to the other of the inputs of AND-gate 29. As a result of said blanking signal, AND-gate 29 is closed to the detected echo signal for approximately twice the length of the transmitted pulse. The closed or delay period thereof is set by the blank generator, in order to permit the high reverberation immediately following the transmitted ping to die out before the echo thereof is received. After this period, the gate is opened, which then permits the detected echo signal to pass therethrough, to timely trigger time comparator multivibrator 32 to an off condition. Of course, if it were not for the blank generator, the subject system would confuse the transmitted ping or the reverberation immediately following the ping with an excessively large echo signal.

At the same time repetition rate oscillator 21 initially triggers transmitter oscillator 22 for effecting broadcast of the ping, it also supplies a trigger pulse similar to that shown in FIG. 3(c) preferably but not necessarily via blank generator 31 to time comparator multivibrator 32 to turn it on, thereby initiating the signal thereat and therefrom which acts as the range measuring reference datum. Of course, as previously mentioned, when time comparator multivibrator 32 receives the aforementioned signal from AND-gate 29, after the reverberation immediately following the transmitted ping has been blanked out, it is turned off. The period of time it is turned on is a measure of the round trip distance to the ocean bottom; hence, the output signal therefrom reflects this time element in its waveform shown in FIG. 3(g), as well as being proportional to the distance the submarine vehicle is from the sea floor at any given instant.

The output signal of time comparator multivibrator 32 is integrated by integrator 33 to produce a signal waveform similar to that shown in FIG. 3(h), in order to combine the discrete "on" portions thereof occurring once each ping-echo cycle and, thus, provide a direct current analog voltage (see FIG. 3(i)) that is proportional to the distance to or altitude above the sea floor at that particular instant.

This distance or altitude DC analog voltage is then algebraically added in summing amplifier 34 to a pair of other control voltages supplied thereto. One of such control voltages is supplied by altitude set voltage generator 37 and is exemplarily shown in FIG. 3(j). It, of course, is the set point voltage that is proportional to the altitude above the sea floor at which the controlled vehicle is intended to be run. When this set voltage is added to that of FIG. 3(i) only, such as when excessive vehicle pitch is not occurring, its waveform would appear as it is shown in FIG. 3(k), and this waveform, therefore, represents the deviation of the submarine vehicle from its set point altitude at any given instant. However, inasmuch as in actual operation some vehicle pitch is occurring practically all of the time, a voltage comparable to that shown in FIG. 3(l), representing said pitch, is supplied by vehicle pitch analog generator 36 and added to the two voltages of FIG. 3(i) and FIG. 3(j). It can, therefore, be seen that the summing amplifier output signal is a composite signal thereof, which may, for example, take the shape of the solid line waveform shown in FIG. 3(m), and, therefore, represents a modified version of the submarine vehicle deviation from the set point altitude at any given instant. This signal is fed to voltage level detector 38 to determine if the threshold voltage (represented by the dashed line of FIG. 3(m) has been achieved. If so, an output signal therefrom similar to that depicted in FIG. 3(n) timely energizes relay 39, which, in turn, actuates vehicle control surface 41 to effect an up-elevator condition. On the other hand, if the aforesaid threshold voltage has not been achieved, no voltage occurs at the output of voltage level detector 38, relay 39 remains deenergized, and vehicle control surface 41 is automatically urged to a down-elevator position. Of course, as is conventional in such vehicles, a change in position of the control surface changes the attitude thereof to move it up or down relative to the sea floor, as it moves along its intended course.

Maximum dive angle regulator 43 is preferably incorporated in this invention, is physically connected to vehicle 42, and is electrically connected to relay 39. In event a vehicle nose-down pitch greater than, for example, thirty degrees from the horizontal inadvertently occurs, maximum dive angle regulator 43 supplies a voltage which overrides the down-elevator no voltage signal by voltage level detector 38 and calls for an up-elevator signal by energizing relay 39. In such case, the output voltage waveform from voltage level detector 38 is modulated by said maximum dive angle regulator overriding voltage to effect a waveform comparable to that exemplarily illustrated in FIG. 3(o), with the square wave portion thereof representing said overriding voltage modulation. Hence, relay 39 would be energized in accordance with the voltage waveform disclosed in FIG. 3(p).

As previously suggested, a conventional switch and conventional associated circuitry may be used as maximum dive angle regulator 43 in the same manner as they are used in the typical level control arts.

Accordingly, it may readily be seen that either an "up" vehicle control surface position of a "down" vehicle control surface position is called for at all times by this invention; and that an "up" position is called for if the vehicle being controlled has deviated from the set altitude position and is too near the ocean bottom, and a "down" position is called for if the vehicle has deviated from the set altitude position and is too far from the ocean bottom.

It may, therefore, be seen from the simplified quasi-pictorial view of FIG. 4 that a movable submarine vehicle, whether self-propelled or towed, will echo-range on the sea floor from any given subaqueous altitude, seek a predetermined set altitude above said sea floor, and hunt therealong, as it travels on its course.

Other modifications and embodiments of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A system for controlling the disposition of a movable vehicle at a predetermined distance from a reference datum comprising in combination:
   means for broadcasting a given energy signal toward said reference datum and generating simultaneously therewith a first timing signal;
   means for receiving an echo of said given energy signal after it has been reflected from said reference datum and simultaneously generating therewith a second timing signal;
   means connected to the outputs of said broadcasting and receiving means for blanking said second timing signal for a predetermined period of time in response to said first timing signal;
   means effectively connected to the outputs of said broadcasting means, said receiving means, and said blanking means for producing a third signal having a voltage level proportional to the time period occurring between said first timing signal and said second timing signal after it has been blanked said predetermined period of time;
   means for generating a fourth signal having a polarized voltage proportional to the aforesaid predetermined distance said movable vehicle is to be controlled from said reference datum;
   means connected to the outputs of said third signal producing means and said fourth signal generating means for algebraically summing the aforesaid third and fourth signals emanating therefrom;
   means attached to the aforesaid movable vehicle for controlling the attitude thereof as it moves along a course; and
   means connected between the output of said summing means and the input of the aforesaid movable vehicle attitude controlling means for guiding said movable vehicle in an upwardly direction whenever the sum of said third and fourth signals exceeds a predetermined value and for guiding it in a downwardly direction whenever the sum of said third and fourth signals is less than said predetermined value.

2. The device of claim 1 wherein said means for broadcasting a given energy signal toward said reference datum and generating simultaneously therewith a first timing signal comprises:
   a repetition rate oscillator;
   a transmitter means connected to the output of said repetition rate oscillator; and
   a transducer connected to the output of said transmitter means.

3. The device of claim 1 wherein said means for receiving an echo of said given energy signal after it has been reflected from said reference datum and simultaneously generating therewith a second timing signal comprises:
   a transducer;
   a receiver connected to the output of said transducer; and
   a detector connected to the output of said receiver.

4. The device of claim 1 wherein said means effectively connected to the outputs of said broadcasting means, said receiving means, and said blanking means for producing a third signal having a voltage level proportional to the time period occurring between said first timing signal and said second timing signal after it has been blanked said predetermined period of time comprises:
   and AND gate having a pair of inputs and an output, with one of the inputs thereof connected to the output of said blanking means, and with the other input thereof connected to the output of said receiving means;
   a time comparator multivibrator having a pair of inputs and an output, with one of the inputs thereof effectively connected to the output of said broadcasting means for response to said first timing signal, and with the other input thereof connected to the output of said receiving means for response to said second timing signal; and
   an integrator connected to the output of the aforesaid time comparator multivibrator.

5. A system for guiding a submarine vehicle in such manner that it will hunt along a predetermined altitude above the sea floor comprising in combination:
   a submarine vehicle adapted for being propelled through sea water;
   movable elevator means mounted on said submarine vehicle for controlling the up and down travel direction thereof, as it is propelled through said sea water;
   means effectively mounted on said submarine vehicle for broadcasting an acoustical signal toward said sea floor;
   generator means, having an input connected to said acoustical signal broadcasting means and a pair of outputs, for producing a first timing signal and a blanking signal of predetermined duration at the instant said acoustical signal is broadcast;

means effectively mounted on said submarine vehicle for receiving an echo of said broadcast acoustical signal after it has been reflected from said sea floor and simultaneously generating therewith a second timing signal;

an AND gate, having a pair of inputs and an output, with one of the inputs thereof connected to the blanking signal output of said generator means, and with the other input thereof connected to the second timing signal output of the aforesaid receiving means;

a time comparator multivibrator, having a pair of inputs and an output, with one of the inputs thereof connected to the output of said AND gate, and with the other input thereof connected to the first timing signal output of said generator means, for producing a square wave output signal having a duration equal to the time period occurring between the aforesaid first and second timing signals after said second timing signal has been blanked for the duration of said blanking signal;

an integrator connected to the output of said time comparator multivibrator;

a vehicle pitch analog voltage generator;

an altitude set voltage generator;

a summing amplifier having a trio of inputs and an output, with one of the inputs thereof connected to the output of said integrator, with another of the inputs thereof connected to the output of said vehicle pitch analog voltage generator, and the remaining input thereof connected to the output of said altitude set voltage generator;

a voltage level detector connected to the output of said summing amplifier;

a relay having a pair of inputs and an output, with one of the inputs thereof connected to the output of said voltage level detector, and with the output thereof connected to the aforesaid elevator means for up and down movement thereof; and a maximum dive angle regulator connected to the other input of said relay for actuation thereof in such manner as to effect an up elevator condition, whenever the dive angle of said submarine vehicle exceeds a predetermined angle with respect to the horizontal.

6. The invention according to claim 5 further characterized by a readout means connected to said integrator for continuously indicating and recording the output thereof in terms of submarine vehicle altitude above the sea floor.

7. The device of claims 5 wherein said means effectively mounted on said submarine vehicle for broadcasting an acoustical signal toward said sea floor is:

a sonar transmitter; and an electroacoustical transmitting transducer connected to the output of said sonar transmitter.

8. The device of claim 5 wherein said means effectively mounted on said submarine vehicle for receiving an echo of said broadcast acoustical signal after it has been reflected from said sea floor and simultaneously generating there with a second timing signal comprises:

an electroacoustical receiving transducer; and a sonar receiver connected to the output of said electroacoustical receiving transducer.

9. The invention according to claim 8 further characterized by a detector connected to the output of said sonar receiver.

* * * * *